US009795970B2

(12) United States Patent
Chavez et al.

(10) Patent No.: US 9,795,970 B2
(45) Date of Patent: Oct. 24, 2017

(54) FLOW REGULATION SYSTEM

(71) Applicants: Leigh Anne Chavez, Beaverton, OR (US); Rodney Chavez, Beaverton, OR (US)

(72) Inventors: Leigh Anne Chavez, Beaverton, OR (US); Rodney Chavez, Beaverton, OR (US)

(73) Assignee: Leigh Anne Chavez, Beaverton, OR (US)

(*) Notice: Subject to any disclaimer, the term of this patent is extended or adjusted under 35 U.S.C. 154(b) by 0 days.

(21) Appl. No.: 14/866,858

(22) Filed: Sep. 26, 2015

(65) Prior Publication Data

US 2017/0087561 A1 Mar. 30, 2017

(51) Int. Cl.

*B65G 51/01* (2006.01)
*B03B 11/00* (2006.01)
*B03B 5/26* (2006.01)

(52) U.S. Cl.

CPC ................ *B03B 11/00* (2013.01); *B03B 5/26* (2013.01)

(58) Field of Classification Search

CPC .... B65G 51/01; B65G 53/30; B65G 53/4675; B65G 53/62

USPC ................ 405/118, 119; 472/117; 193/35 G; 406/191

See application file for complete search history.

(56) References Cited

U.S. PATENT DOCUMENTS

| | | | | | |
|---|---|---|---|---|---|
| 41,285 | A | * | 1/1864 | DuBois | E03F 3/046 405/119 |
| 679,965 | A | * | 8/1901 | Holdt | E03F 3/046 405/118 |
| 1,569,777 | A | * | 1/1926 | Muehleisen | E02B 13/00 405/119 |
| 1,740,732 | A | * | 12/1929 | Griffin | E21B 21/065 209/2 |
| 2,042,350 | A | * | 5/1936 | McGuire | E02B 13/02 405/104 |
| 2,156,713 | A | * | 5/1939 | Whitcomb | B65G 51/01 114/46 |
| 2,725,720 | A | | 12/1955 | Lough | |
| 2,997,345 | A | * | 8/1961 | Stahle | A01K 79/00 406/102 |
| 3,199,140 | A | * | 8/1965 | McKnight | E05F 1/1261 105/425 |
| 3,389,834 | A | * | 6/1968 | Collins | B65G 53/30 222/133 |
| 3,401,527 | A | | 9/1968 | Palmer et al. | |
| 3,807,806 | A | * | 4/1974 | Takahashi | E02B 5/06 104/154 |
| 4,117,635 | A | * | 10/1978 | Nelson | E04D 13/076 405/119 |
| 4,149,710 | A | * | 4/1979 | Rouchard | A63G 21/18 104/70 |
| 4,194,733 | A | * | 3/1980 | Whitehouse, Jr. | A63G 21/18 104/70 |
| 4,334,806 | A | * | 6/1982 | Liu | B65G 51/01 406/147 |

(Continued)

*Primary Examiner* — Joseph Dillon, Jr.

(57) ABSTRACT

A flow regulation system includes a sluice box that may be positioned adjacent to a fluid source. The sluice box may have a fluid urged therethrough. A regulator is slidably attached to the sluice box such that the regulator selectively restricts a flow of the fluid through the sluice box. The regulator resists being urged by the fluid flowing through the sluice box.

10 Claims, 3 Drawing Sheets

(56) References Cited

U.S. PATENT DOCUMENTS

| | | | | |
|---|---|---|---|---|
| 4,345,853 | A * | 8/1982 | Fisher | E04D 13/08 405/119 |
| 4,807,422 | A * | 2/1989 | Blanc | A23N 12/023 53/248 |
| 5,642,534 | A | 7/1997 | Sanchez et al. | |
| 6,017,446 | A * | 1/2000 | Harms | B23Q 11/1069 184/6.14 |
| 6,138,812 | A * | 10/2000 | Kimener | E06B 11/00 193/35 G |
| 6,439,369 | B1 * | 8/2002 | Brown | B65G 47/647 193/35 G |
| 6,708,737 | B1 * | 3/2004 | Bratten | B23Q 11/005 141/286 |
| 6,840,715 | B2 * | 1/2005 | Crovara Pescia | B65G 51/01 406/198 |
| 7,244,078 | B2 | 7/2007 | Aughton et al. | |
| 7,461,999 | B2 | 12/2008 | Aughton et al. | |
| D662,575 | S | 6/2012 | Corpuz, Jr. et al. | |
| 8,602,686 | B2 | 12/2013 | Aughton et al. | |
| 8,899,875 | B1 * | 12/2014 | Bramble | E04D 13/08 405/119 |
| 9,216,864 | B1 * | 12/2015 | Plessius | B65G 51/01 |
| 2009/0003933 | A1 * | 1/2009 | Anderson | E01C 11/227 405/119 |
| 2010/0236993 | A1 | 9/2010 | Goodrich et al. | |
| 2011/0220828 | A1 | 9/2011 | Kennedy | |
| 2012/0011802 | A1 * | 1/2012 | Bertucci | E04D 13/08 52/745.21 |
| 2015/0016898 | A1 * | 1/2015 | Hockett | B65G 47/684 406/108 |

* cited by examiner

FLOW REGULATION SYSTEM

BACKGROUND OF THE DISCLOSURE

Field of the Disclosure

The disclosure relates to regulation devices and more particularly pertains to a new regulation device for regulating a flow of a fluid through a sluice box.

SUMMARY OF THE DISCLOSURE

An embodiment of the disclosure meets the needs presented above by generally comprising a sluice box that may be positioned adjacent to a fluid source. The sluice box may have a fluid urged therethrough. A regulator is slidably attached to the sluice box such that the regulator selectively restricts a flow of the fluid through the sluice box. The regulator resists being urged by the fluid flowing through the sluice box.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
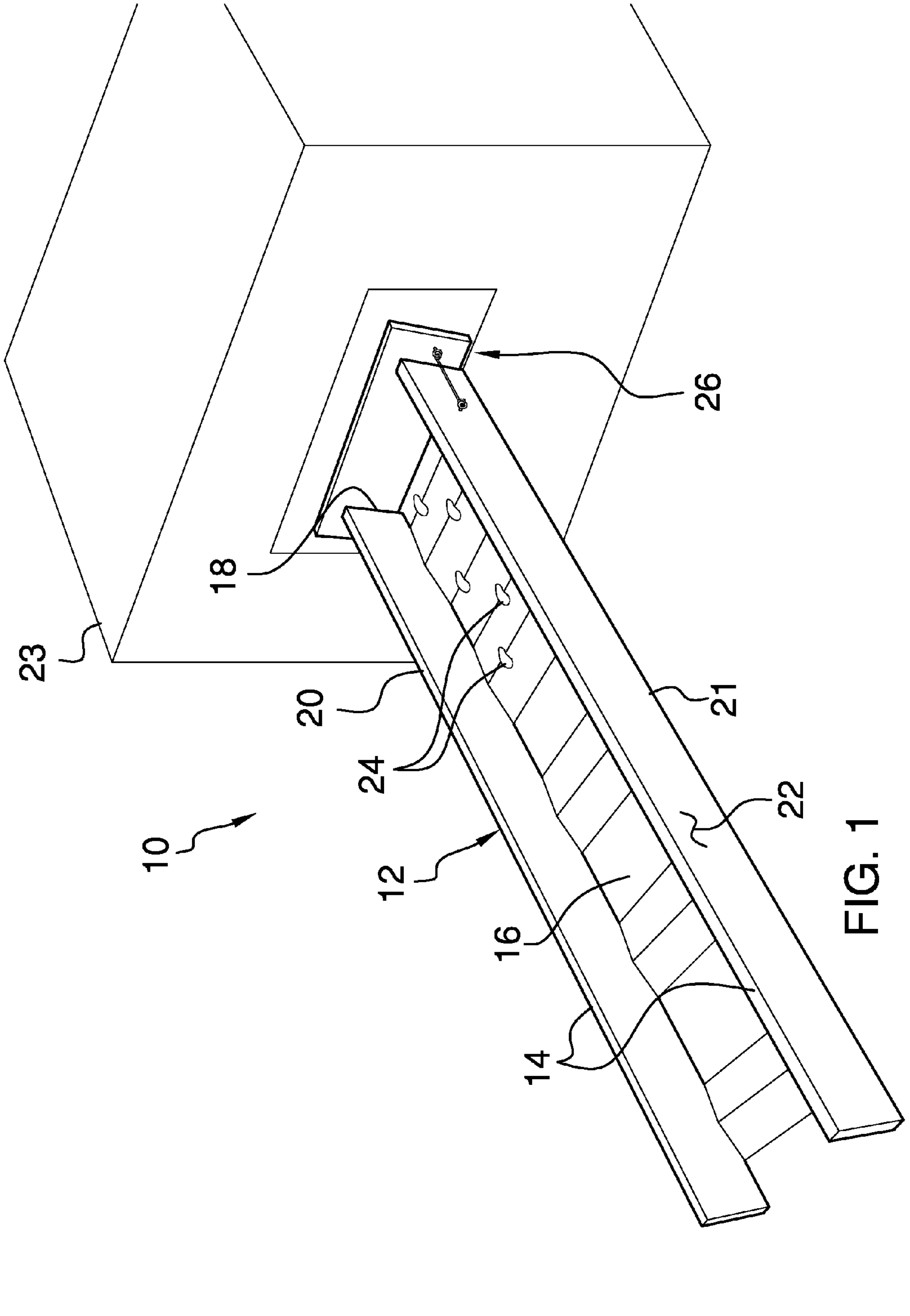
FIG. 1 is a perspective in-use view of a flow regulation system according to an embodiment of the disclosure.
Figure 2:
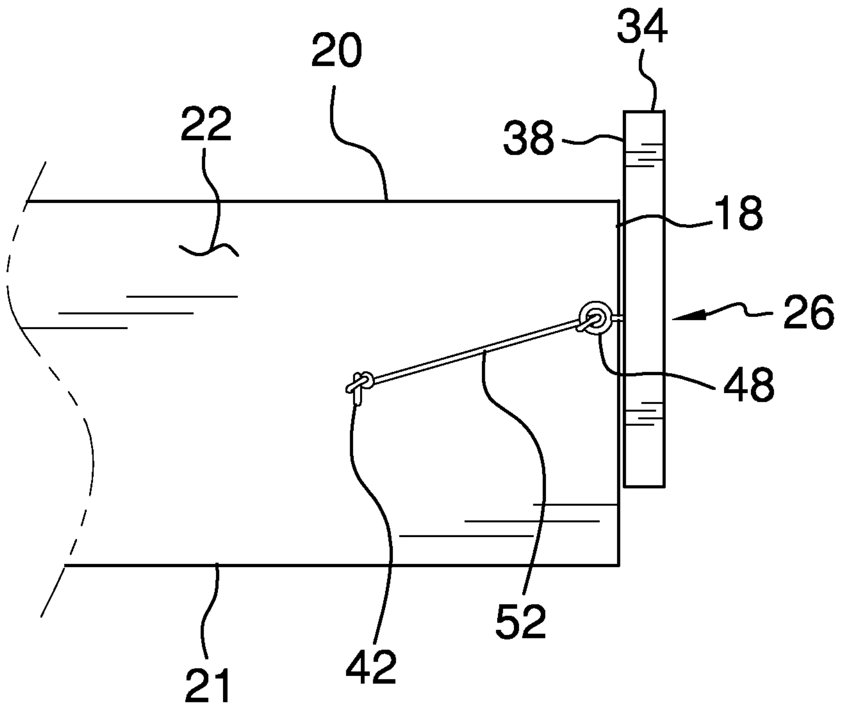
FIG. 2 is a right side view of an embodiment of the disclosure.
Figure 3:
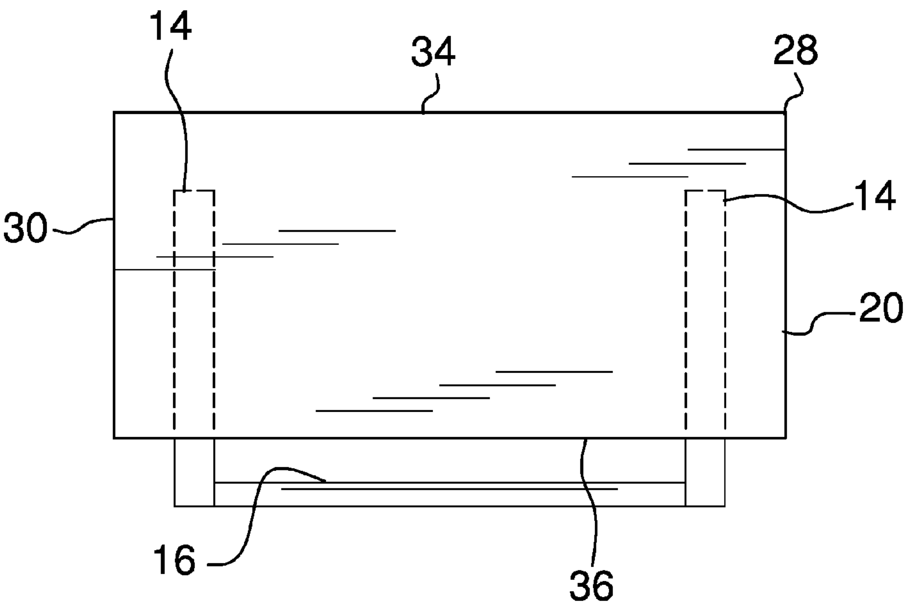
FIG. 3 is a front view of an embodiment of the disclosure.
Figure 4:
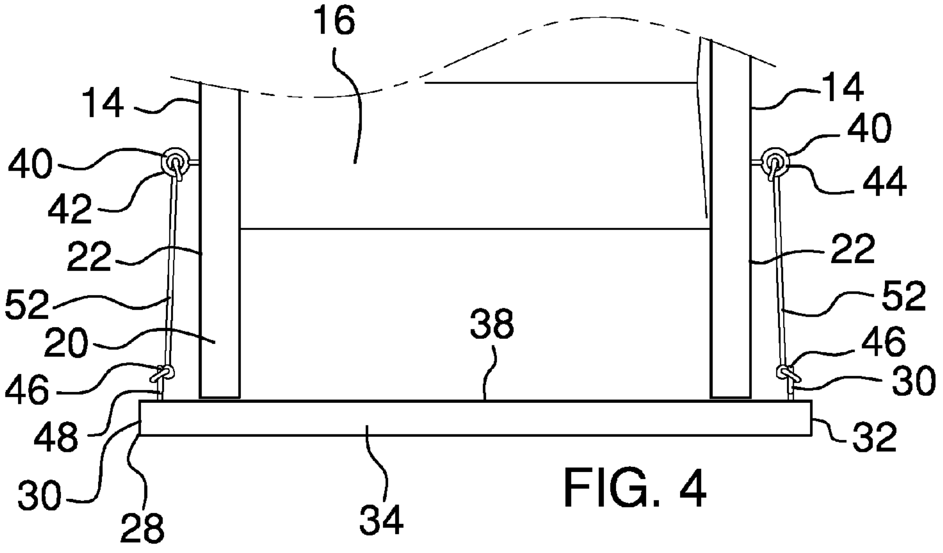
FIG. 4 is a top view of an embodiment of the disclosure.

With reference now to the drawings, and in particular to FIGS. 1 through 4 thereof, a new regulation device embodying the principles and concepts of an embodiment of the disclosure and generally designated by the reference numeral 10 will be described.

As best illustrated in FIGS. 1 through 4, the flow regulation system 10 generally comprises a sluice box 12 that has a pair of lateral members 14 and a bottom wall 16. The lateral members 14 are spaced apart from each other with respect to the bottom wall 16 and each of the lateral members 14 has a first end 18, an upper edge 20, a lower edge 21 and an outwardly facing surface 22. The sluice box 12 may have a width ranging between approximately ten inches and twenty inches. The first end 18 of each of the lateral members 14 may be positioned adjacent to a fluid source 23. The fluid source 23 may comprise mining equipment or the like utilized in the separation of precious metals from soil. The sluice box 12 may have a fluid 24 urged therethrough such that the fluid 24 flows between the lateral members 14 and the fluid 24 may comprise a mixture of water and soil from the mining equipment.

A regulator 26 is slidably attached to the sluice box 12 and the regulator 26 is positioned on the first end 18 of each of the lateral members 14. Thus, the regulator 26 selectively determines an amount of fluid 24 that is released from the fluid source 23 into the sluice box 12. The regulator 26 resists being urged by the fluid 24 that flows through the sluice box 12. The regulator 26 comprises a plate 28 that has a primary end 30, a secondary end 32, a top edge 34, a bottom edge 36 and a first surface 38 extending between the primary end 30 and the secondary end 32. The plate 28 is positioned on the sluice box 12 having the first surface 38 abutting the first end 18 of each of the lateral members 14. Thus, the plate 28 is positioned between the lateral members 14 and the fluid source 23.

Each of the primary end 30 and the secondary end 32 are spaced outwardly from an associated one of the lateral members 14 and the top edge 34 is spaced upwardly from the upper edge 20 of each of the lateral members 14. Each of the primary end 30 and the secondary end 32 may extend beyond the lateral members 14 a distance of at least two inches. Additionally, the top edge 34 of the plate 28 may extend above the upper edge 20 a distance of at least one inch. The plate 28 is positionable in a closed position having the bottom edge 36 of the plate 28 being aligned with the bottom wall 16 of the sluice box 12. Thus, the plate 28 restricts a flow of the fluid 24 through the sluice box 12. The plate 28 is positionable in an open position having the bottom edge 36 being spaced a selectable distance away from the bottom wall 16. Thus, the plate 28 allows a flow of the fluid 24 through the sluice box 12.

A pair of primary fasteners 40 is provided and each of the primary fasteners 40 is attached to the outwardly facing surface 22 of an associated one of the lateral members 14. Each of the primary fasteners 40 is positioned adjacent to the first end 18 of the associated lateral member 14. Each of the primary fasteners 40 may be spaced from the first end 18 a distance ranging between approximately four inches and six inches. Additionally, each of the primary fasteners 40 may be centrally positioned between the upper edge 20 and the lower edge 19. The pair of primary fasteners 40 comprises a first primary fastener 42 and a second primary fastener 44. Each of the primary fasteners 40 may comprise an eyebolt or the like.

A pair of secondary fasteners 46 is provided and each of the secondary fasteners 46 is attached to the first surface 38 of the plate 28. Each of the secondary fasteners 46 is positioned adjacent to an associated one of the primary end 30 and the secondary end 32 of the plate 28. Each of the secondary fasteners 46 may be spaced from the associated primary 30 and secondary 32 ends a distance ranging between approximately one inch and two inches. Additionally, each of the secondary fasteners 46 may be centrally positioned between the top edge 34 and the bottom edge 36. The pair of secondary fasteners 46 comprises a first secondary fastener 48 and a second secondary fastener 50. The first secondary fastener 48 is aligned with the first primary fastener 42 and the second secondary fastener 50 is aligned with the second primary fastener 44. Each of the secondary fasteners 46 may comprise an eyebolt or the like.

A pair of biasing members 52 is provided. One of the biasing members 52 is attached between the first primary fastener 42 and the first secondary fastener 48. One of the biasing members 52 is attached between the second primary fastener 44 and the second secondary fastener 50. Each of the biasing members 52 biases the plate 28 against the first end 18 of the lateral members 14. Thus, the first surface 38 of the plate 28 frictionally engages the first end 18 of the lateral members 14. Each of the biasing members 52 may comprise a bungee cord or other object comprised of a resiliently stretchable material.

Each of the biasing members 52 retains the bottom edge 36 of the plate 28 at the selected distance from the bottom wall 16 of the sluice box 12 when the plate 28 is positioned in the open position. Thus, the plate 28 selectively determines the flow rate of the fluid 24 through the sluice box 12. Each of the biasing members 52 retains the bottom edge 36 in alignment with the bottom wall 16 when the plate 28 is positioned in the closed position. Thus, the plate 28 restricts the flow of fluid 24 though the sluice box 12. Additionally, each of the biasing members 52 prevents the plate 28 from being urged upwardly or downwardly by the flow of the fluid 24.

In use, the sluice box 12 is positioned having the plate 28 being positioned between the sluice box 12 and the fluid source 23. The plate 28 is positioned in the open position and the plate 28 is manipulated to position the bottom edge 36 of the plate 28 a selected distance away from the bottom wall 16 of the sluice box 12. Thus, the plate 28 determines a flow rate of the fluid 24 through the sluice box 12. The biasing members 52 retain the bottom edge 36 the selected distance from the bottom wall 16 such that the selected flow rate is maintained. The plate 28 is positioned in the closed position to restrict the fluid 24 from flowing through the sluice box 12. The biasing members 52 retain the plate 28 in the closed position thereby facilitating the contents of the sluice box 12 to be examined without having to reposition the sluice box 12 with respect to the fluid source 23.

With respect to the above description then, it is to be realized that the optimum dimensional relationships for the parts of an embodiment enabled by the disclosure, to include variations in size, materials, shape, form, function and manner of operation, system and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A flow regulation system for regulating a flow of a fluid through a sluice box, said system comprising:

- a sluice box being configured be positioned adjacent to a fluid source, said sluice box being configured to have a fluid urged therethrough;
- a regulator being slidably attached to said sluice box wherein said regulator is configured to selectively restrict a flow of the fluid through said sluice box, said regulator being configured to resist being urged by the fluid flowing through said sluice box;
- a pair of lateral members, each of said lateral members having a first end and an outwardly facing surface;
- a pair of primary fasteners, each of said primary fasteners being attached to said outwardly facing surface of an associated one of said lateral members, each of said primary fasteners being positioned adjacent to said first end of said associated lateral member, said pair of primary fasteners comprising a first primary fastener and a second primary fastener;
- a plate having a primary end, a secondary end and a first surface; and
- a pair of secondary fasteners, each of said secondary fasteners being attached to said first surface of said plate, each of said secondary fasteners being positioned adjacent to an associated one of said primary end and said secondary end of said plate, said secondary fasteners comprising a first secondary fastener and a second secondary fastener, said first secondary fastener being aligned with said first primary fastener, said second secondary fastener being aligned with said second primary fastener.

2. The system according to claim 1, wherein said sluice box has a pair of lateral members and a bottom wall, said lateral members being spaced apart from each other with respect to said bottom wall, each of said lateral members having a first end, an upper edge and an outwardly facing surface, said first end of each of said lateral members.

3. The system according to claim 1, wherein said regulator comprises a plate having a primary end, a secondary end, a top edge, a bottom edge and a first surface extending between said primary end and said secondary end.

4. The system according to claim 2, wherein:

- said sluice box includes a pair of lateral members and a bottom wall, each of said lateral members having a first end; and
- said plate is positioned on said sluice box having said first surface abutting said first end of each of said lateral members wherein said plate is configured to be positioned between said lateral members and the fluid source, each of said primary end and said secondary end being spaced outwardly from an associated one of said lateral members, said top edge being spaced upwardly from said upper edge of each of said lateral members.

5. The system according to claim 4, wherein said plate is positionable in a closed position having said bottom edge being aligned with said bottom wall such that said plate is configured to restrict a flow of the fluid through said sluice box.

6. The system according to claim 4, wherein said plate is positionable in an open position having said bottom edge being spaced a selectable distance away from said bottom wall wherein said plate is configured to allow a flow of the fluid through said sluice box.

7. The system according to claim 1, further comprising a pair of biasing members, one of said biasing members being attached between said first primary fastener and said first secondary fastener, one of said biasing members being attached between said second primary fastener and said second secondary fastener, each of said biasing members biasing said plate against said first end of said lateral members such that said first surface of said plate frictionally engages said first end of said lateral members.

8. The system according to claim 7, wherein:

- said sluice box has a bottom wall;
- said plate is positionable in an open position; and each of said biasing members retaining said bottom edge of said plate at the selected distance from said bottom wall of said sluice box when said plate is positioned in said open position wherein said plate is configured to selectively determine the rate of the flow of fluid through said sluice box.

9. The system according to claim 8, wherein:

said plate is positionable in a closed position; and each of said biasing members retaining said bottom edge in alignment with said bottom wall when said plate is positioned in said closed position.

10. A flow regulation system for regulating a flow of a fluid through a sluice box, said system comprising:

a sluice box having a pair of lateral members and a bottom wall, said lateral members being spaced apart from each other, each of said lateral members having a first end, an upper edge and an outwardly facing surface, said first end of each of said lateral members being configured to be positioned adjacent to a fluid source, said sluice box being configured to have a fluid urged therethrough such that the fluid flows between said lateral members; and a regulator being slidably attached to said sluice box, said regulator being positioned on said first end of said lateral members wherein said regulator is configured to selectively restrict a flow of the fluid through said sluice box, said regulator being configured to resist being urged by the fluid flowing through said sluice box, said regulator comprising:

a plate having a primary end, a secondary end, a top edge, a bottom edge and a first surface extending between said primary end and said secondary end, said plate being positioned on said sluice box having said first surface abutting said first end of each of said lateral members wherein said plate is configured to be positioned between said lateral members and the fluid source, each of said primary end and said secondary end being spaced outwardly from an associated one of said lateral members, said top edge being spaced upwardly from said upper edge of each of said lateral members, said plate being positionable in a closed position having said bottom edge being aligned with said bottom wall such that said plate is configured to restrict a flow of the fluid through said sluice box, said plate being positionable in an open position having said bottom edge being spaced a selectable distance away from said bottom wall wherein said plate is configured to allow a flow of the fluid through said sluice box, a pair of primary fasteners, each of said primary fasteners being attached to said outwardly facing surface of an associated one of said lateral members, each of said primary fasteners being positioned adjacent to said first end of said associated lateral member, said pair of primary fasteners comprising a first primary fastener and a second primary fastener, a pair of secondary fasteners, each of said secondary fasteners being attached to said first surface of said plate, each of said secondary fasteners being positioned adjacent to an associated one of said primary end and said secondary end of said plate, said secondary fasteners comprising a first secondary fastener and a second secondary fastener, said first secondary fastener being aligned with said first primary fastener, said second secondary fastener being aligned with said second primary fastener, and a pair of biasing members, one of said biasing members being attached between said first primary fastener and said first secondary fastener, one of said biasing members being attached between said second primary fastener and said second secondary fastener, each of said biasing members biasing said plate against said first end of said lateral members such that said first surface of said plate frictionally engages said first end of said lateral members, each of said biasing members retaining said bottom edge of said plate at the selected distance from said bottom wall of said sluice box when said plate is positioned in said open position wherein said plate is configured to selectively determine the rate of the flow of fluid through said sluice box, each of said biasing members retaining said bottom edge in alignment with said bottom wall when said plate is positioned in said closed position.

* * * * *